(12) United States Patent
Huang et al.

(10) Patent No.: US 9,374,706 B2
(45) Date of Patent: *Jun. 21, 2016

(54) WIRELESS SENSOR NETWORK AND CENTRAL NODE DEVICE THEREOF

(71) Applicant: I-SHOU UNIVERSITY, Kaohsiung (TW)

(72) Inventors: Yu-Jung Huang, Kaohsiung (TW); Hsuan-Hsun Wu, Kaohsiung (TW)

(73) Assignee: I-SHOU UNIVERSITY, Kaohsiung (TW)

( * ) Notice: Subject to any disclaimer, the term of this patent is extended or adjusted under 35 U.S.C. 154(b) by 0 days.

This patent is subject to a terminal disclaimer.

(21) Appl. No.: 14/708,309

(22) Filed: May 11, 2015

(65) Prior Publication Data

US 2016/0007192 A1  Jan. 7, 2016

Related U.S. Application Data

(62) Division of application No. 13/761,144, filed on Feb. 6, 2013, now Pat. No. 9,060,265.

(51) Int. Cl.
| | |
|---|---|
| *H04K 1/00* | (2006.01) |
| *H04W 12/04* | (2009.01) |
| *H04W 12/02* | (2009.01) |
| *G06F 19/00* | (2011.01) |
| *H04L 9/08* | (2006.01) |
| *G06F 17/00* | (2006.01) |
| *H04L 29/06* | (2006.01) |
| *H04W 4/00* | (2009.01) |
| *H04L 29/08* | (2006.01) |
| *H04W 12/06* | (2009.01) |
| *H04W 84/18* | (2009.01) |

(52) U.S. Cl.
CPC .............. *H04W 12/04* (2013.01); *G06F 19/00* (2013.01); *H04L 9/0863* (2013.01); *H04L 9/0869* (2013.01); *H04L 9/0891* (2013.01); *H04W 12/02* (2013.01); *H04L 67/12* (2013.01); *H04L 2209/805* (2013.01); *H04W 4/005* (2013.01); *H04W 12/06* (2013.01); *H04W 84/18* (2013.01)

(58) Field of Classification Search
CPC ... H04W 12/02; H04L 9/0863; H04L 9/0869; G06F 19/00
USPC .............. 380/28–30, 255–283; 713/150–154, 713/160–167, 189–193
See application file for complete search history.

(56) References Cited

U.S. PATENT DOCUMENTS

| | | | | |
|---|---|---|---|---|
| 2005/0140964 | A1* | 6/2005 | Eschenauer | H04L 63/1408 356/10 |
| 2008/0046732 | A1* | 2/2008 | Fu | G06Q 20/3674 713/171 |
| 2011/0268274 | A1* | 11/2011 | Qiu | H04L 9/0844 380/270 |

* cited by examiner

*Primary Examiner* — Evans Desrosiers
(74) *Attorney, Agent, or Firm* — Jianq Chyun IP Office

(57) ABSTRACT

The invention is directed to a wireless sensor network system. The wireless sensor network system is adapted for a medication information security environment, and the wireless sensor network system comprising a first sensor node, a second sensor node and a central node. The first sensor node sends a request for registration and a user identification. The central node generates and stores a first set of random number and a second set of random number when receiving the request for registration and the user identification. The central node sends the first set of random number and the second set of random number to the first sensor node and the second sensor node respectively.

7 Claims, 7 Drawing Sheets

WIRELESS SENSOR NETWORK AND CENTRAL NODE DEVICE THEREOF

CROSS-REFERENCE TO RELATED APPLICATION

This application is a divisional application of and claims the priority benefit of U.S. application Ser. No. 13/761,144, filed on Feb. 6, 2013, now allowed. The entirety of the above-mentioned patent application is hereby incorporated by reference herein and made a part of this specification.

BACKGROUND OF THE INVENTION

1. Field of Invention

The present invention generally relates to a wireless sensor network system adapted for a medication information security environment and more particularly to a method for medication information security by using Padgen algorithm.

2. Description of Prior Art

Wireless sensor network (WSN) has been broadly applied in our daily life along with the development of wireless sensor network technologies. In Wireless Sensor Network, the sensor nodes are distributed in the environment to collect information according to detection of an event. Data and information are sent to the user or base-station, which allows the user to have further data analysis and data processing. Wireless sensor network have autonomous and ubiquitous nature. Therefore, the use of wireless sensor networks has been emerging in numerous domains. Some of the application areas where sensor networks represent a key infrastructure for the development of new services and applications include smart houses, smart hospitals, smart factories, smart transportation, smart public spaces, and smart cities. Wireless sensor network could form a variety of sensor network architecture by implementing many kinds of wireless networking technologies.

It is worth to mention that, WSN have many merits such as distributed sensors, low power consumption and real-time signal transmissions which are excellent for improving the efficiency of data collecting and management. Upon their advantages could assist the outnumbered human resources in circumstances of the hospital nowadays have inevitably come to encounter. For instance, in a smart hospital, by distributing sensors at the pharmacy end nearby a hospital will allow the Hospital Information System (HIS) to handle correct data transmission of inpatients' identifications, appropriate prescriptions and quantities of medicine. The Hospital Information System will prevent errors that might occur due to individual medical personnel's lack of judgment, neglect human resource shortages and improve medical safety problems. The patient safety can be improved by means of proper Information Technology (IT) systems. For instance, failure due to a misinterpretation of a hand-written prescription can be easily avoided with IT tools.

However, despite wireless communication system applied in a hospital IT infrastructure can provide fast and convenient message delivery solutions, but the transmission accesses are accomplished through air in an open space where data protection methods become an important research area for addressing security, privacy and confidentiality issue of inpatients. If the data is sent without protection, it will let the transmission of data being tampered or thieved easily. Therefore, in wireless sensor network adapted in healthcare applications, medical sensors sense the patient and environmental data, and send it either to the physician or the hospital server. If the data sent without protection, it will make the transmission of data tampering or theft of information vulnerable to attacks and cause the receiver to receive incorrect messages and result unexpected damage. A medication error is a failure in the treatment process that may harm a patient. In summary, it means if the wireless transmission of information exchange has not been protected properly, the transmission of data messages will be very vulnerable when an adversary carries out attacking, eavesdropping, stealing, intercepting and tampering on communication between sensor nodes, which could lead to incorrect or altered messages delivery, in result causes a severe medical casualty.

Hence, how to protect the privacy of each inpatient and prevent malice attack are the key points in the promotion of wireless sensor networks. Accordingly, a wireless sensor network system which offers both high privacy protection and effective abnormal event announcement is to be developed. It is essential to continue study related topics on cryptography and encryption methodology to enhance the implemented wireless communication system in a hospital environment with the idea of low cost, lightweight, low computational consumption of the encryption method and high efficiency.

SUMMARY OF THE INVENTION

The invention is directed to a wireless sensor network system adapted for a medication information security environment for data protection purpose.

The invention provides a wireless sensor network system. The wireless sensor network system is adapted for a medication information security environment, and the wireless sensor network system comprising a first sensor node, a second sensor node and a central node. The first sensor node sends a request for registration and a user identification. The central node generates and stores a first set of random number and a second set of random number when receiving the request for registration and the user identification. The central node sends the first set of random number and the second set of random number to the first sensor node and the second sensor node respectively. Wherein, a password and a message are encoded and decoded by using a Padgen function operation with the first set of random number and the second set of random number for generating a cover-coded password and a first cover-coded message transmitted between the first sensor node and the central node, or generating the cover-coded password a second cover-coded message transmitted between the second sensor node and the central node.

The invention provides a central node device that encodes and decodes data in a wireless sensor network system. The central node device comprises a key generation circuit, a password decoder circuit and a XOR operation circuit. The key generation circuit receives a first cover-coded message, a password and a user identification, producing a plurality of pad keys by using a Padgen function operation. The key generation circuit outputs the pad keys, wherein the first cover-coded message comprises a first least-bit cover-coded message and a first most-bit cover-coded message. The password decoder circuit decodes a cover-coded password to generate the password by using part of the pad keys. The XOR operation circuit performs a XOR operation for decoding the first most-bit cover-coded message and the first least-bit cover-coded message to obtain a first most-bit message and a first least-bit message. The XOR operation circuit encodes the first most-bit message and the first least-bit message, and outputs a second most-bit cover-coded message and a second least-bit cover-coded message.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
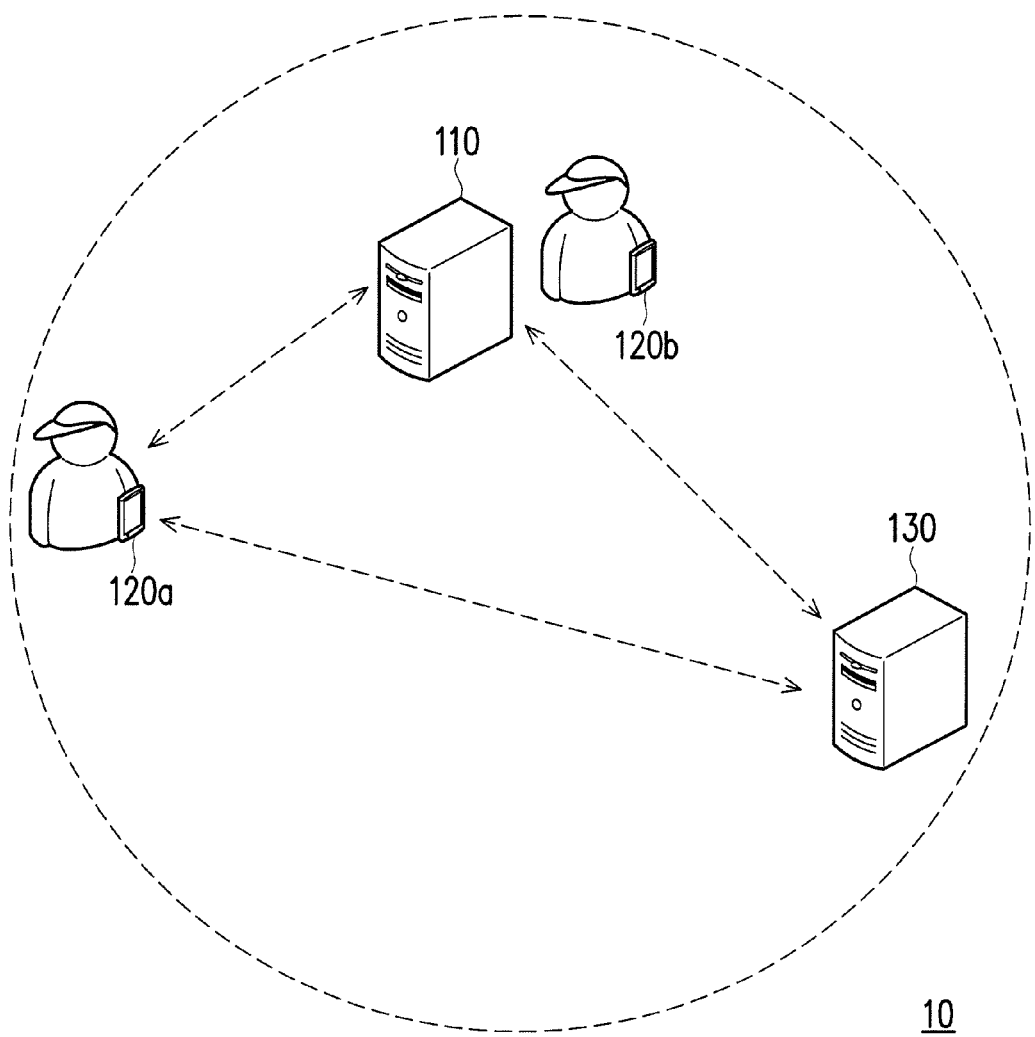
FIG. 1 illustrates a system architecture of a wireless sensor network system.

Reference will now be made in detail to the present preferred embodiment of the invention, examples of which are illustrated in the accompanying drawings. Wherever possible, the same reference numbers are used in the drawings and the description to refer to the same or like parts.

Some portions of the description which follows are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm, protocol or scheme is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Security is crucial in WSN and basic security mechanisms and protocols that can provide protection to the services and the information flow are needed. This means that the hardware layer should be protected against node compromise, communication channels should meet certain security goals (like confidentiality, integrity and authentication), and protocols and services of the network should be robust against any possible interference. There are many encryption methods which are developed in recent years, and one of a low-cost encryption method is Padgen algorithm. Padgen algorithm could encrypt the data to prevent the data been attack by others. For example, a wireless data transmission scheme can be described as follow. If the node receives the correct password PWD, then user of the node can access the message Msg. Assuming that the message Msg and the password PWD are 32-bit data and can be expressed as:

$$Msg = a_0 a_1 a_2 \ldots a_{31} \quad (1.1)$$

$$PWD = p_0 p_1 p_2 \ldots p_{31} \quad (1.2)$$

The random number Rt and Rm can be assumed to be 16-bit data, and can be expressed as:

$$Rt = d_{t1} d_{t2} d_{t3} d_{t4} (\text{Base } 16) \quad (1.3)$$

$$Rm = d_{m1} d_{m2} d_{m3} d_{m4} (\text{Base } 16) \quad (1.4)$$

The message Msg and password PWD are XOR with a PAD key to generate cover coding message CCMsgx and cover coding password CCPWDx. Through the XOR pad operation, the message Msg and password PWD can then be recover back to their original form. The XOR pad operation can be described as the following equations:

$$CCMsgx = PAD \oplus Msg \quad (1.5)$$

$$CCPWDx = PAD \oplus PWD \quad (1.6)$$

$$Msg = PAD \oplus CCMsgx \quad (1.7)$$

$$PWD = PAD \oplus CCPWDx \quad (1.8)$$

FIG. 1 illustrates a system architecture of a wireless sensor network system. Referring to FIG. 1, a wireless sensor network system 10 may include a first sensor node 120a, a second sensor node 130 and a central sensor node 110. In a medication information security environment, the first sensor node 120a could be a mobile electronic device of an employee in a hospital. For example, doctors can use a PDA or a smart phone to manage the information on the patients. Hence, wireless sensor network system 10 may includes other first sensor nodes, such as sensor node 120b. The second sensor node 130 may be a data storage device in the pharmacy, saves the medicine information of the inpatient and other information about the medicine. The central node 110 may be a hospital information device that controls the data transmission in the wireless sensor network system 10. In order to perform the communication between the sensor nodes, the wireless sensor network may support IEEE 802.11 standard, IEEE 802.15.4 standard, WiFi standard, bluetooth standard, or ZigBee wireless communication protocol standard. But the invention is not limited thereto.

First of all, the first sensor node 120a may send a request and a user identification for registration to the central node 110. The central node 110 may generate and store a first set of random number and a second set of random number when receiving the request for registration and the user identification, and send the first set of random number and the second set of random number to the first sensor node 120a and the second sensor node 130 respectively. Then, a password and a message are encoded and decoded by using a Padgen function operation with the first set of random number and the second set of random number for generating a cover-coded password and a first cover-coded message transmitted between the first sensor node 120a and the central node 110, or generating the cover-coded password a second cover-coded message transmitted between the second sensor node 130 and the central node 110.

Besides, the wireless the cover-coded message may be encoded by CRC code before being sent, and the cover-coded message with CRC code may be checked when received.

An embodiment of the invention, a protocol for using in a Wireless Sensor Network (WSN) is provided. The protocol preferably comprises 3 phases: registration, authentication and password change.

Figure 2:
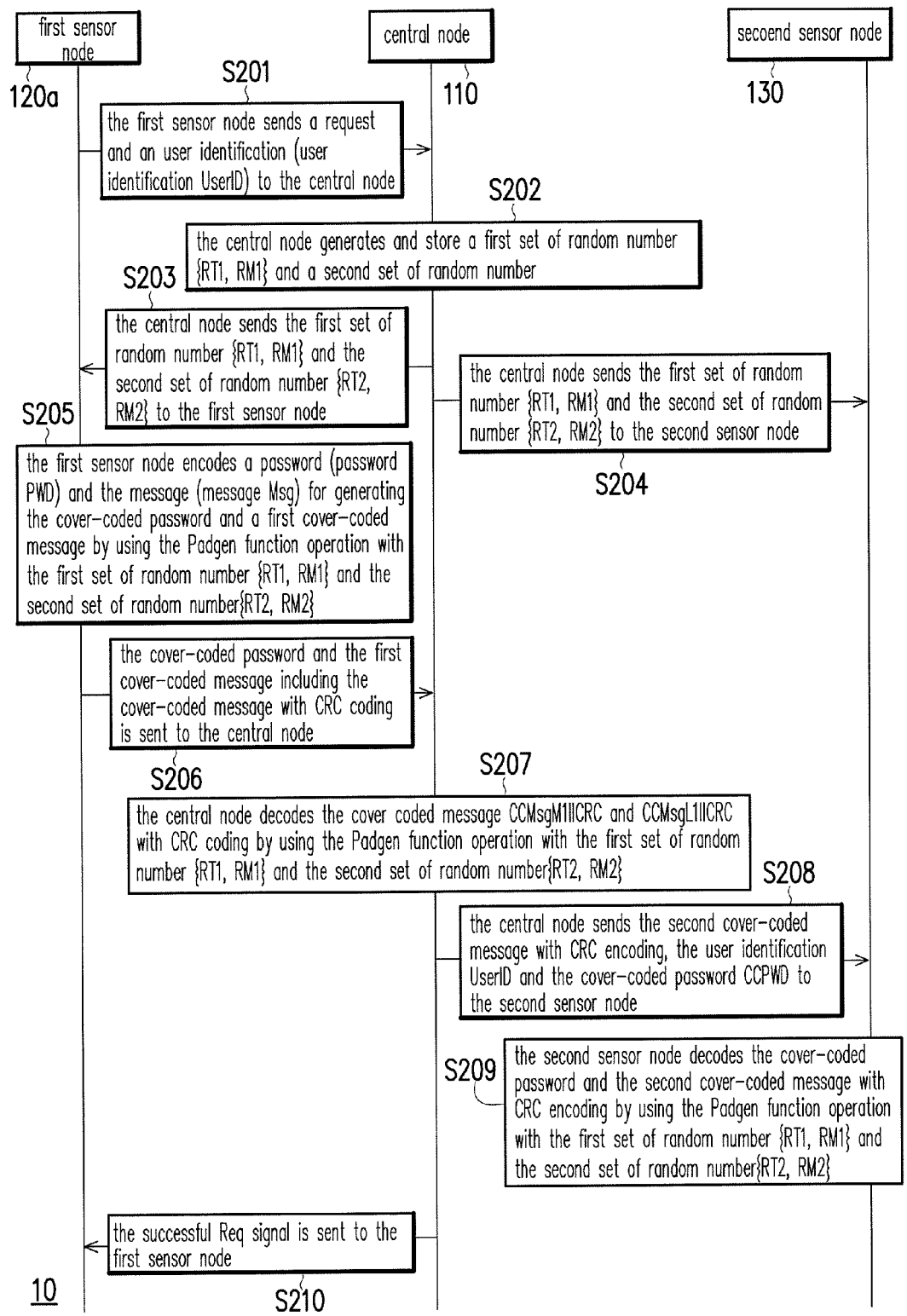
FIG. 2 is a flow chart illustrating the steps of registration phase in accordance with an embodiment of the present invention.

FIG. 2 is a flow chart illustrating the steps of registration phase in accordance with an embodiment of the present invention. According to this embodiment, Medication Safety WSN authentication protocol is divided into three phases: registration, authentication and password change. The registration phase is illustrated in the FIG. 2.

Besides, in this embodiment, the wireless the cover-coded message is encoded by CRC code before being send, and the cover-coded message with CRC code is checked when received. Cyclic redundancy check code (CRC) is a packet based network or computer data files. A short hash of fixed digit function is mainly used to detect or verify the data or save possible errors. Generated number in the transmission or storage before the data is calculated and attached to the back, and then to test the receiver to determine whether the data is correct or not.

In order to communicate with other sensor nodes, the first sensor node 120a should have a user identification to log in the wireless sensor network system, so the registration phase should be progressed in the beginning of the protocol.

Referring to FIG. 2, in the step S201, the first sensor node 120a sends a request and a user identification (user identification UserID) to the central node 130. In the step S202, the central node 110 may generate and store a first set of random number {RT1, RM1} and a second set of random number {RT2, RM2} when receiving the request for registration and the user identification (UserID). In the step S203, the central node 130 sends the first set of random number {RT1, RM1} and the second set of random number {RT2, RM2} to the first sensor node 120a. In the step S204, the central node 130 sends the first set of random number {RT1, RM1} and the second set of random number {RT2, RM2} to the second sensor node 130. In the step S205, the first sensor node 120a may encode a password (password PWD) and the message (message Msg) for generating the cover-coded password and a first cover-coded message by using a Padgen function operation with the first set of random number {RT1, RM1} and the second set of random number {RT2, RM2}.

More specifically, in this embodiment, the pad keys may be generated to encode the password (password PWD) and the message (message Msg). For example, the pad keys PAD1, PAD2, PAD3, PAD4 are obtained by selecting user identification UserID or password PWD with the specific random numbers for Padgen function operation. The password PWD is encoded by the pad keys PAD1 and PAD2. Besides, the message is separated into the first most-bit message MsgM and the first least-bit message MsgL, and the first most-bit message MsgM and the first least-bit message MsgL are encoded by the pad keys PAD3 and PAD4 respectively. The cover coded message CCMsgM1 and CCMsgL1 are computed, followed by CRC encoding. The following equations are used to describe the above process:

$$\text{UserID-PadGen}(RT1 \oplus RM1, RT2 \oplus RM2) = PAD1 \quad (1.9)$$

$$\text{UserID-PadGen}(RT1 \oplus RM2, RT2 \oplus RM1) = PAD2 \quad (1.10)$$

$$\text{UserID-PadGen}(RT1, RM1) = PAD3 \quad (1.11)$$

$$\text{PWD-PadGen}(PAD3, RT1) = PAD4 \quad (1.12)$$

$$CCPWD = PWD \oplus \{PAD1 \| PAD2\} \quad (1.13)$$

$$CCMsgM1 = MsgM \oplus PAD3 \quad (1.14)$$

$$CCMsgL1 = MsgL \oplus PAD4 \quad (1.15)$$

In the step S206, the cover-coded password CCPWD and the first cover-coded message including to the cover coded message CCMsgM1∥CRC and CCMsgL1∥CRC with CRC coding is sent to the central node 110. So that, the message and user identification has been protected during the transmission period by encoding. In the step S207, the central node 110 decodes the cover coded message CCMsgM1∥CRC and CCMsgL1∥CRC with CRC coding by using the Padgen function operation with the first set of random number {RT1, RM1} and the second set of random number {RT2, RM2}. The central node 110 also encodes the message for generating a second cover-coded message by using a Padgen function operation with the first set of random number {RT1, RM1} and the second set of random number {RT2, RM2}. In other words, the pad keys PAD1 to PAD6 are produced by selecting user identification UserID or password PWD with the specific random numbers for Padgen function operation. Afterwards, through XOR operation, the first most-bit message MsgM, the first least-bit message MsgL, PWD and CCMsgM2∥CRC and CCMsgL2∥CRC are obtained. After verifying by CRC decoding, the following equations are used to describe the above process:

$$\text{UserID-PadGen}(RT1 \oplus RM1, RT26 \oplus RM2) = PAD1 \quad (1.16)$$

$$\text{UserID-PadGen}(RT1 \oplus RM2, RT2 \oplus RM1) = PAD2 \quad (1.17)$$

$$PWD = CCPWD \oplus \{PAD1 \| PAD2\} \quad (1.18)$$

$$\text{UserID-PadGen}(RT1, RM1) = PAD3 \quad (1.19)$$

$$\text{PWD-PadGen}(PAD3, RT1) = PAD4 \quad (1.20)$$

$$MsgM = CCMsgM1 \oplus PAD3 \quad (1.21)$$

$$MsgL = CCMsgL1 \oplus PAD4 \quad (1.22)$$

$$\text{UserID-PadGen}(RT2, RT2 \oplus RM2) = PAD5 \quad (1.23)$$

$$\text{PWD-PadGen}(PAD5, RT2) = PAD6 \quad (1.24)$$

$$CCMsgM2 = MsgM \oplus PAD5 \quad (1.25)$$

$$CCMsgL2 = MsgL \oplus PAD6 \quad (1.26)$$

In the step S208, the central node 110 sends the second cover-coded message with CRC encoding (CCMsgM2∥CRC and CCMsgL2∥CRC), the user identification UserID and the cover-coded password CCPWD to the second sensor node 130. In the step S209, the second sensor node 130 decodes the cover-coded password and the second cover-coded message with CRC encoding (CCMsgM2∥CRC and CCMsgL2∥CRC) by using the Padgen function operation with the first set of random number {RT1, RM1} and the second set of random number {RT2, RM2}. In other words, the pad keys PAD1, PAD2, PAD5 and PAD6 are obtained by selecting user identification UserID or password PWD with the specific random numbers for Padgen function operation. Then PWD, MsgM and MsgL are computed through XOR operation. After verifying by CRC decoding, the following equations are used to describe the above process:

$$\text{UserID-PadGen}(RT1 \oplus RM1, RT2 \oplus RM2) = PAD1 \quad (1.27)$$

$$\text{UserID-PadGen}(RT1 \oplus RM2, RT2 \oplus RM1) = PAD2 \quad (1.28)$$

$$PWD = CCPWD \oplus \{PAD1 \| PAD2\} \quad (1.29)$$

$$\text{UserID-PadGen}(RT2RM2) = PAD5 \quad (1.30)$$

$$\text{PWD-PadGen}(PAD5RT2) = PAD6 \quad (1.31)$$

$$\text{Msg}M = \text{CCMsg}M2 \oplus \text{PAD5} \quad (1.32)$$

$$\text{Msg}L = \text{CCMsg}L2 \oplus \text{PAD6} \quad (1.33)$$

At last, in the step S210, the successful Req signal is sent to the central node 110 to indicate the completion of the phase. Therefore, the password PWD and the message Msg are encrypted with the pad keys, only the one with correct random number can decode the data transmitted between the sensor nodes. In this embodiment, only the first sensor node 120a, the second sensor node 130 and the central sensor node 110 have the same random number. The purpose of certification is required to verify the message, and meanwhile it must be covered up to avoid transmission over exposed directly.

Figure 3:
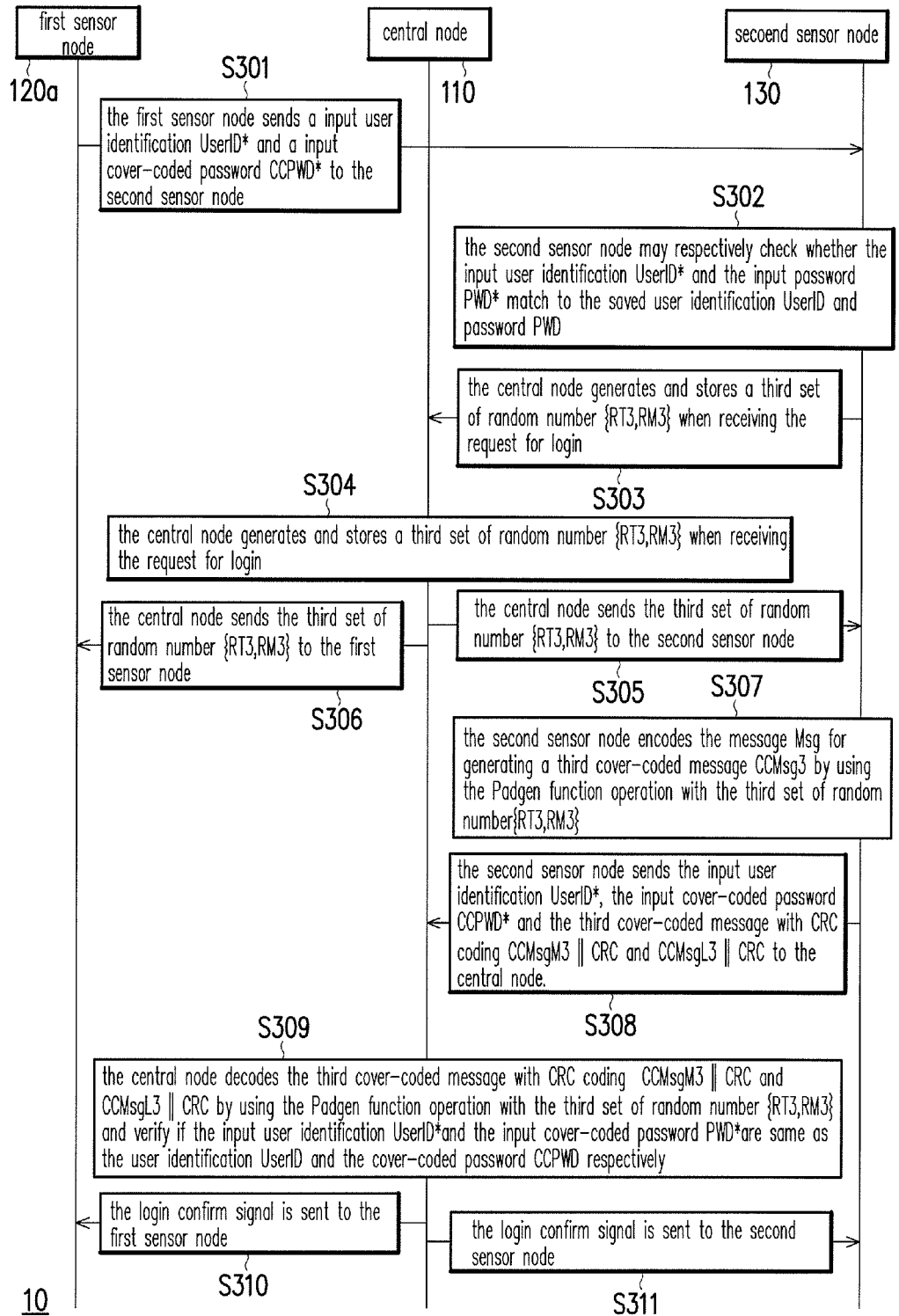
FIG. 3 is a flow chart illustrating the steps of authentication phase in accordance with an embodiment of the present invention.

FIG. 3 is a flow chart illustrating the steps of registration phase in accordance with an embodiment of the present invention. According to this embodiment, Medication Safety WSN authentication protocol is divided into three phases: registration, authentication and password change. The authentication phase is illustrated in the FIG. 3. Besides, in this embodiment, the cover-coded message is encoded by CRC code before being send, and the cover-coded message with CRC code is checked when received. After the registration phase, the second sensor node 130 has already had the user identification.

In the step S301, the first sensor node 120a sends an input user identification UserID* and an input cover-coded password CCPWD* to the second sensor node 130. More specific, the input user identification UserID* and the input password PWD* are entered by the user of the first sensor node 120a, and the first sensor node 120a encode the input password PWD* to generate input cover-coded password CCPWD* transmitted between nodes. In the step S302, the second sensor node 130 may respectively check whether the input user identification UserID* and the input password PWD* match to the saved user identification UserID and password PWD.

In the step S303, the second sensor node 130 sends a request for login to the central node 110 if the input user identification UserID* and the input password PWD* are same as the user identification UserID and the password PWD respectively. In the step S304, the central node 130 may generate and store a third set of random number {RT3, RM3} when receiving the request for login. In the step S305, the central node 130 may send the third set of random number {RT3, RM3} to the second sensor node 130. In the step S306, the central node 130 may send the third set of random number {RT3, RM3} to the first sensor node 120a.

In the step S307, the second sensor node 130 may encode the message Msg for generating a third cover-coded message CCMsg3 by using the Padgen function operation with the third set of random number {RT3, RM3}. Besides, the message is separated to the first most-bit message MsgM and the first least-bit message MsgL, and the first most-bit message MsgM and the first least-bit message MsgL are encoded by the pad keys PAD7 and PAD8 respectively. In other words, the pad key PAD7 and PAD8 are produced by selecting the user identification UserID or password PWD with the specific set of random numbers for Padgen function operation. Afterwards, through XOR operation, CCMsgM3||CRC and CCMsgL3||CRC are obtained. The following equations are used to describe the above process:

$$\text{UserID-PadGen}(RT3, RM3) = \text{PAD7} \quad (2.1)$$

$$\text{PWD-PadGen}(\text{PAD7}, RT3) = \text{PAD8} \quad (2.2)$$

$$\text{CCMsg}M3 = \text{Msg}M \oplus \text{PAD7} \quad (2.3)$$

$$\text{CCMsg}L3 = \text{Msg}L \oplus \text{PAD8} \quad (2.4)$$

In the step S308, the second sensor node 130 may send the input user identification UserID*, the input cover-coded password CCPWD* and the third cover-coded message with CRC coding CCMsgM3||CRC and CCMsgL3||CRC to the central node 110. In the step S309, the central node 110 decodes the third cover-coded message with CRC coding CCMsgM3||CRC and CCMsgL3||CRC by using the Padgen function operation with the third set of random number {RT3, RM3} if the input user identification UserID*and the input cover-coded password PWD*are same as the user identification UserID and the cover-coded password CCPWD respectively. In other words, the pad keys PAD7 and PAD8 are produced by selecting UserID or PWD with the specific set of random numbers for Padgen function operation. Then password PWD, the first most-bit message MsgM and the first least-bit message MsgL are computed through XOR operation. The following equations are used to describe the above process:

$$\text{UserID-PadGen}(RT3, RM3) = \text{PAD7} \quad (2.5)$$

$$\text{PWD-PadGen}(\text{PAD7}, RT3) = \text{PAD8} \quad (2.6)$$

$$\text{Msg}M = \text{CCMsg}M3 \oplus \text{PAD7} \quad (2.7)$$

$$\text{Msg}L = \text{CCMsg}L3 \oplus \text{PAD8} \quad (2.8)$$

At last, In the step S310 and S311, a login confirm signal is sent to the first sensor node 120a and the second sensor node 130 end for complete of the phase. In that way, the first sensor node 120a could access the data from the second sensor node 130, and data transmitted between the first sensor node 120a and the second sensor node 130 will be encrypted by using Padgen algorithm. Obviously, in this invention, there are not only 2 pad keys will be generated, and as a result, the robustness of the wireless sensor network system 10 is improved.

Figure 4:
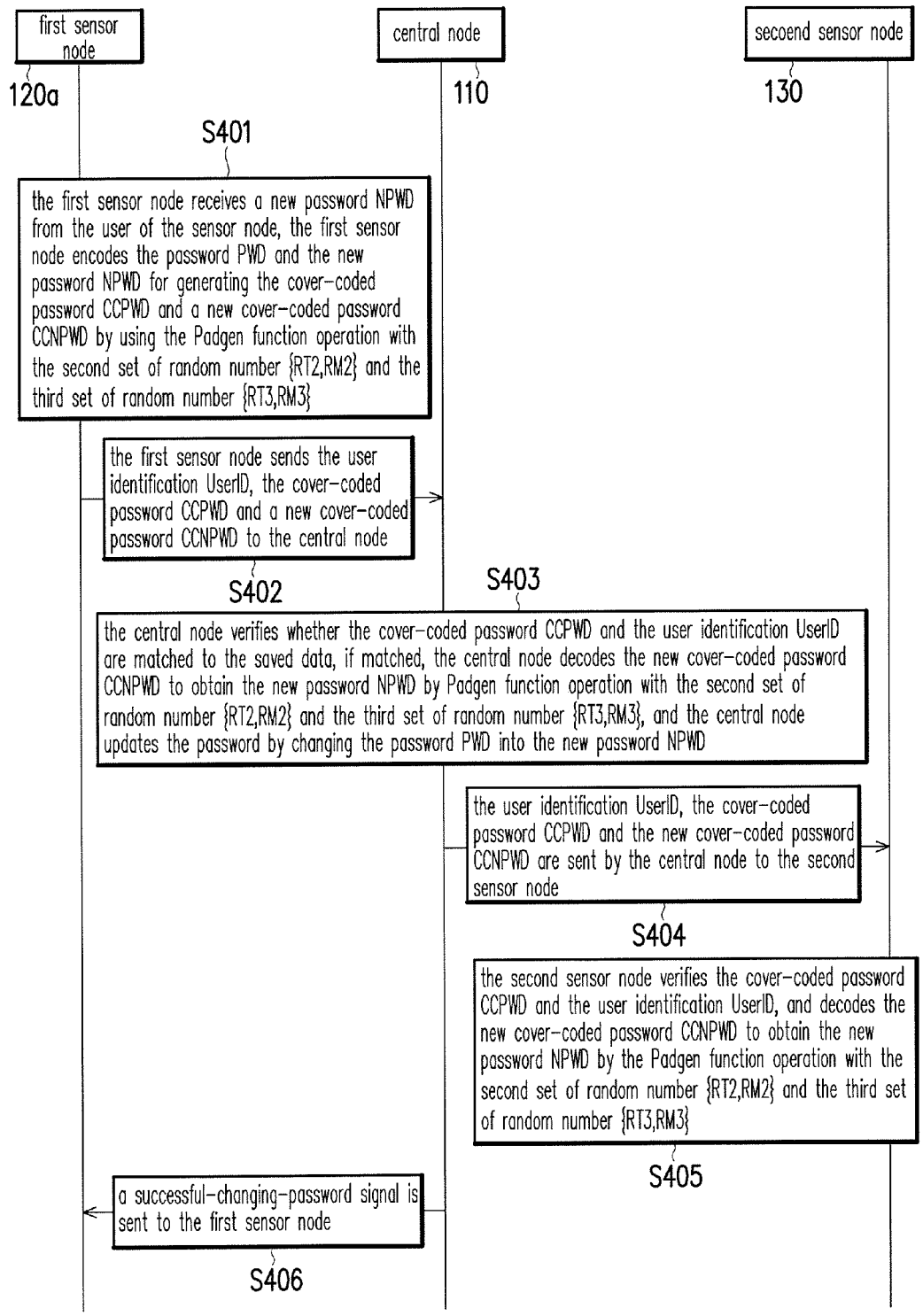
FIG. 4 is a flow chart illustrating the steps of password change phase in accordance with an embodiment of the present invention.

Once the user want to change the used password, the first sensor node 120a may encrypt the new password and transmit the new password to second sensor node 130 and the central node 110. FIG. 4 is a flow chart illustrating the steps of password change phase in accordance with an embodiment of the present invention. Referring to FIG. 4, in the step S401, the first sensor node 120a may receive a new password NPWD from the user of the sensor node 120a, the first sensor node 120a encodes the password PWD and the new password NPWD for generating the cover-coded password CCPWD and a new cover-coded password CCNPWD by using the Padgen function operation with the second set of random number {RT2, RM2} and the third set of random number {RT3, RM3}. Then NPWD will be encrypted by XOR operation, and the new cover-coded password CCNPWD is obtained thereby. The following equations are used to describe the above process:

$$\text{UserID-PadGen}(RT2 \oplus RM2, RT3 \oplus RM3) = \text{PAD9} \quad (3.1)$$

$$\text{PWD-PadGen}(\text{PAD9}, RT2 \oplus RTM3) = \text{PAD10} \quad (3.2)$$

$$\text{CCNPWD} = \text{NPWD} \oplus \{\text{PAD9}, \text{PAD10}\} \quad (3.3)$$

In the step S402, the first sensor node 120a sends the user identification UserID, the cover-coded password CCPWD and a new cover-coded password CCNPWD to the central node 110. In the step S403, the central node 110 verifies whether the cover-coded password CCPWD and the user identification UserID are matched to the saved data. Then, if matched, the central node 110 may decode the new cover-coded password CCNPWD to obtain the new password NPWD by Padgen function operation with the second set of random number {RT2, RM2} and the third set of random number {RT3, RM3}, and the central node 110 updates the password by changing the password PWD into the new password NPWD. The central node 110 sends the user identification UserID, the cover-coded password CCPWD and the new cover-coded password CCNPWD to the second sensor node 130. In other words, the central node 110 will verify received UserID and CCPWD before changing the password PWD into the password CCNPWD. Afterwards, the calculation with the user identification UserID or the password PWD selected along with specific random numbers given to Padgen function for obtaining pad keys PAD9 and PAD10 is begun. Hence, NPWD is gained through XOR operation between the pad keys and CCNPWD, and then it is stored and updated. The following equations are used to describe the above process:

$$\text{UserID–PadGen}(RT2 \oplus RT2, RT3 \oplus RM3) = \text{PAD9} \quad (3.4)$$

$$\text{PWD–PadGen}(\text{PAD9}, RT2 \oplus RTM3) = \text{PAD10} \quad (3.5)$$

$$\text{NPWD} = \text{CCNPWD} \oplus \text{PAD9}, \text{PAD10} \quad (3.6)$$

In the step S404, the user identification UserID, the cover-coded password CCPWD and the new cover-coded password CCNPWD are sent by the central node 110 to the second sensor node 130. In the step S405, similarly, the second sensor node 130 verifies the cover-coded password CCPWD and the user identification UserID. The second sensor node 130 decodes the new cover-coded password CCNPWD to obtain the new password NPWD by the Padgen function operation with the second set of random number {RT2, RM2} and the third set of random number {RT3, RM3}. The central node 110 updates the password by changing the password PWD into the new password NPWD. In other words, the second sensor node 130 will verify received UserID and CCPWD for matching. Afterwards, the calculation with UserID or PWD selected along with specific random numbers given to Padgen function for obtaining pad keys PAD9 and PAD10 is begun. Hence, NPWD is gained through XOR operation between the pad keys and CCNPWD, and then it is stored and updated. The following equations are used to describe the above process:

$$\text{UserID–PadGen}(RT2 \oplus RM2, RT3 \oplus RM3) = \text{PAD9} \quad (3.7)$$

$$\text{PWD–PadGen}(\text{PAD9}, RT2 \oplus RTM3) = \text{PAD10} \quad (3.8)$$

$$\text{NPWD} = \text{CCNPWD} \oplus \{\text{PAD9}, \text{PAD10}\} \quad (3.9)$$

At last, in the step S406, a successful-changing-password signal is sent to the first sensor node 120a. In summary, in order to achieve the stated advantages and put into practical usage of protecting the communication security between the sender and receiver (e.g., first sensor node 120a or central node 110), a dynamic user authentication scheme of wireless sensor network system 10 has been proposed to suit the infrastructure of a hospital information system. On the other hands, in view of other proposed mutual authentication protocol, the invention to encrypt the transmission data in a medication information security environment by using the Padgen algorithm.

Figure 5:
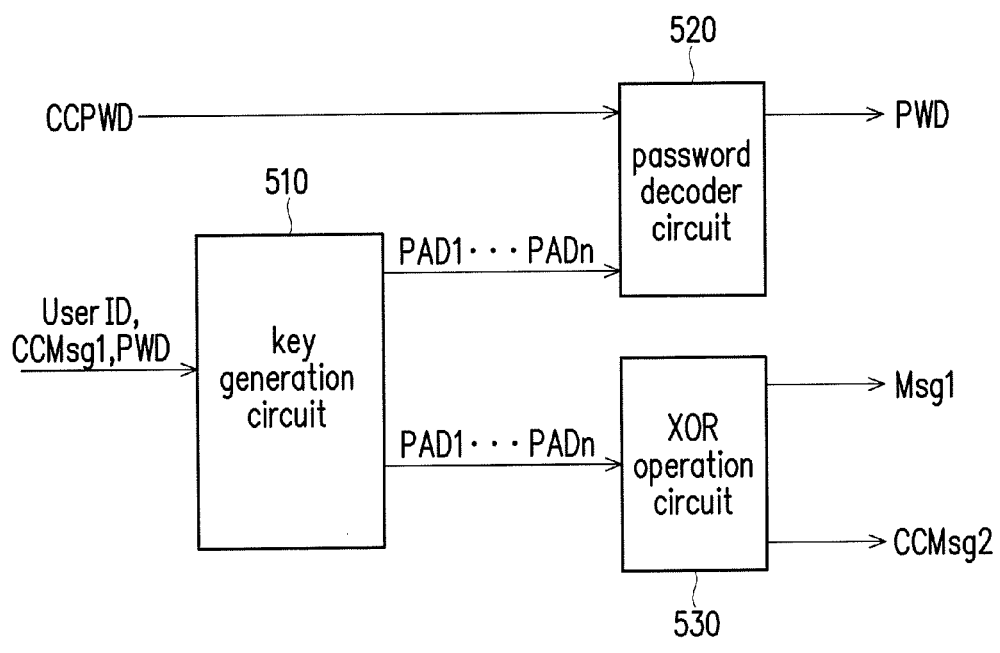
FIG. 5 illustrates a schematic diagram of a central node device according to an embodiment of the invention.

FIG. 5 illustrates a schematic diagram of a central node device according to an embodiment of the invention, wherein the central node device 50 that encodes and decodes data in a wireless sensor network system. For example, the central node device 50 may be a control center of the hospital information system. The central node device 50 comprises a key generation circuit 510, a password decoder circuit 520 and a XOR operation circuit 530. The key generation circuit 510 receives a first cover-coded message CCMsg1, a password PWD and a user identification UserID. The key generation circuit 510 produces a plurality of pad keys PAD1~PADn by using a Padgen function operation, and outputs the pad keys PAD1~PADn to the password decoder circuit 520 and the XOR operation circuit 530. The password decoder circuit 520 decodes a cover-coded password CCPWD to generate the password PWD by using part of the pad keys.

The XOR operation circuit 530 performs a XOR operation for decoding the first cover-coded message CCMsg1 to obtain a first message Msg1. Also, the XOR operation circuit 530 may encodes the first message Msg1 to output a second cover-coded message CCMsg2. Obviously, the central node device 50 could both encode and decode the message (or information) been transmitted. In the invention, the pad keys could be generated by the key generation circuit, and the amount of the pad keys is flexible.

Figure 6:
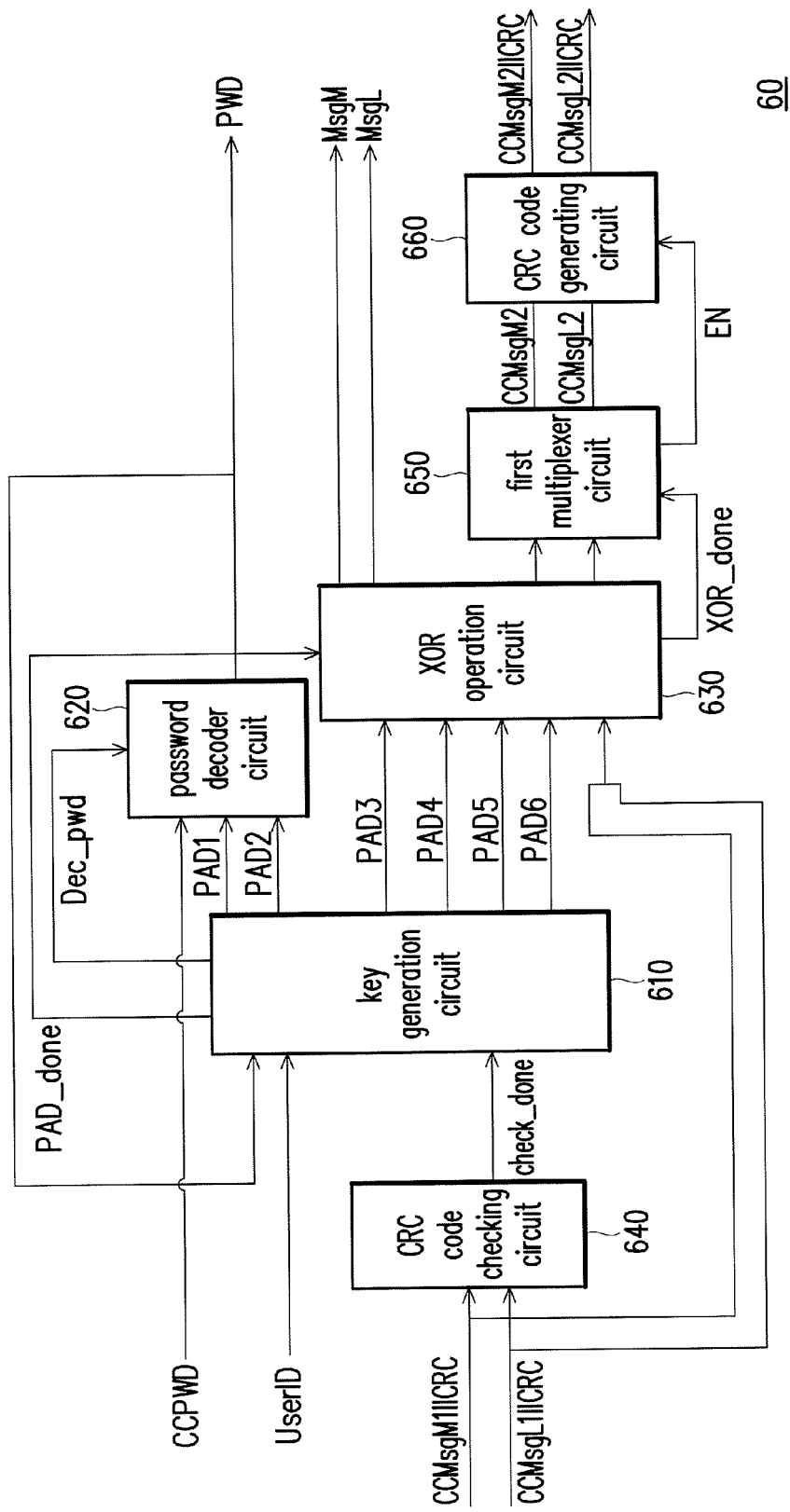
FIG. 6 illustrates a schematic diagram of a central node device according to an embodiment of the invention.

FIG. 6 illustrates a schematic diagram of a central node device according to another embodiment of the invention. A central node device 60 that encodes and decodes data in a wireless sensor network system. For example, the central node device 60 may be a control center of the hospital information system. The central node device 60 comprises a key generation circuit 610, a password decoder circuit 620 and a XOR operation circuit 630. Further, in this embodiment of the invention the central node device 60 further comprises a cyclic redundancy check (CRC) code checking circuit 640, a first multiplexer circuit 650 and a cyclic redundancy check (CRC) code generating circuit 660. Also, in this embodiment of the invention, the first cover-coded message is separated into a first least-bit cover-coded message MsgM1 and a first most-bit cover-coded message MsgL1.

The cyclic redundancy check (CRC) code checking circuit 640 receives the first most-bit cover-coded message with CRC code CCMsgM1∥CRC and the first least-bit cover-coded message with CRC code CCMsgL1∥CRC, wherein the first most-bit cover-coded message with CRC code CCMsgM1∥CRC and the first least-bit cover-coded message with CRC code CCMsgL1∥CRC are first most-bit cover-coded message CCMsgM1 and first least-bit cover-coded message CCMsgL1 concatenated with cyclic redundancy check codes respectively. The cyclic redundancy check (CRC) code checking circuit 640 verifies if the first most-bit cover-coded message with CRC code CCMsgM1∥CRC and first least-bit cover-coded message with CRC code CCMsgL1∥CRC are correct by using the corresponding CRC code, and outputs an enable signal Check_done to the key generation circuit 610.

The first multiplexer circuit 650 may collect the second most-bit cover-coded message CCMsgM2 and the second least-bit cover-coded message CCMsgL2 and determine whether to output the second most-bit cover-coded message CCMsgM2 or to output the second least-bit cover-coded message CCMsgL2. The CRC code generating circuit 660 may receives the second most-bit cover-coded message CCMsgM2 and the second least-bit cover-coded message CCMsgL2 from the first multiplexer circuit 650. The cyclic redundancy check (CRC) code generating circuit 660 process cyclic redundancy check code encoding for the second most-bit cover-coded message CCMsgM2 and the second least-bit cover-coded message CCMsgL2, and outputs the second most-bit cover-coded message CCMsgM1∥CRC and the second least-bit cover-coded message CCMsgL1∥CRC with cyclic redundancy check codes respectively.

Referring to FIG. 6 again, the block diagram of central node device 60 has the function of verifying the correctness of the received or input cover-coded messages employing cyclic redundancy check code method, generating the required pad keys (e.g., pad keys PAD1~PADn) for decoding the received cover-coded password CCPWD and input cover-coded messages, and also for encoding the messages that are to be transmitted. In this embodiment, n is equal to 6, but the invention is not limited thereto. The specific steps of the above said processing are illustrated in detail as follows. Initially, the user identification UserID, cover-coded password CCPWD, cover-coded message of most and least bits CCMsgM1||CRC and CCMsgL1||CRC concatenated with their cyclic redundancy check code respectively. The first most-bit cover-coded message CCMsgM1||CRC and the first least-bit cover-coded message CCMsgL1||CRC are the received data inputs of Medication Safety System scheme. Then, the cyclic redundancy check (CRC) code checking circuit 640 will calculate and verify if the first most-bit cover-coded message CCMsgM1 and the first least-bit cover-coded message CCMsgL1 are correct using their corresponding CRC code. A signal named Check_done is outputted by the cyclic redundancy check (CRC) code checking circuit 640.

Upon receiving input enable signal Check_done, the key generation circuit 610 is able to produce the pad keys PAD1, PAD2, PAD3, PAD4, PAD5 and PAD6 in sequence under six control states, as will be mentioned later. 6 states of the key generation circuit 610 are used to produce the pad keys PAD1, PAD2, PAD3, PAD4, PAD5 and PAD6. Meanwhile, when the key generation circuit 610 produces PAD2 on state {001}, an enable signal Dec_pwd is also sent to the password decoder circuit 620. When the password decoder circuit 620 is enabled, the password decoder circuit 620 is used to operate decoding on CCPWD as shown below (4.1). The password PWD gained will be feedback to the key generation circuit 610 for its state 4 to 6's XOR-Padgen calculation.

$$PWD = CCPWD \oplus \{PAD1 \| PAD2\} \quad (4.1)$$

Once the all six PADs are produced by the key generation circuit 610, enabling signal PAD_done will be transmitted to the XOR operation circuit 630, performs the XOR operation for decoding inputs CCMsgM1 and CCMsgM1. After decoding, the message Msg is obtained (shown in (4.2) and (4.3)), and then an internal signal is given for calculating on the massage Msg for producing CCMsgM2 and CCMsgL2 (shown in (4.4) and (4.5)).

$$MsgM = CCMsgM1 \oplus PAD3 \quad (4.2)$$

$$MsgL = CCMsgL1 \oplus PAD4 \quad (4.3)$$

$$CCMsgM2 = MsgM \oplus PAD5 \quad (4.4)$$

$$CCMsgL2 = MsgL \oplus PAD6 \quad (4.5)$$

The first multiplexer circuit 650 may collect CCMsgM2 and CCMsgL2, and then gives the signal EN to a cyclic redundancy check (CRC) code generating circuit 660, which allows it to process cyclic redundancy check code encoding for CCMsgM2 and CCMsgL2. At last, CCMsgM2||CRC and CCMsgL2||CRC are outputted.

Figure 7:
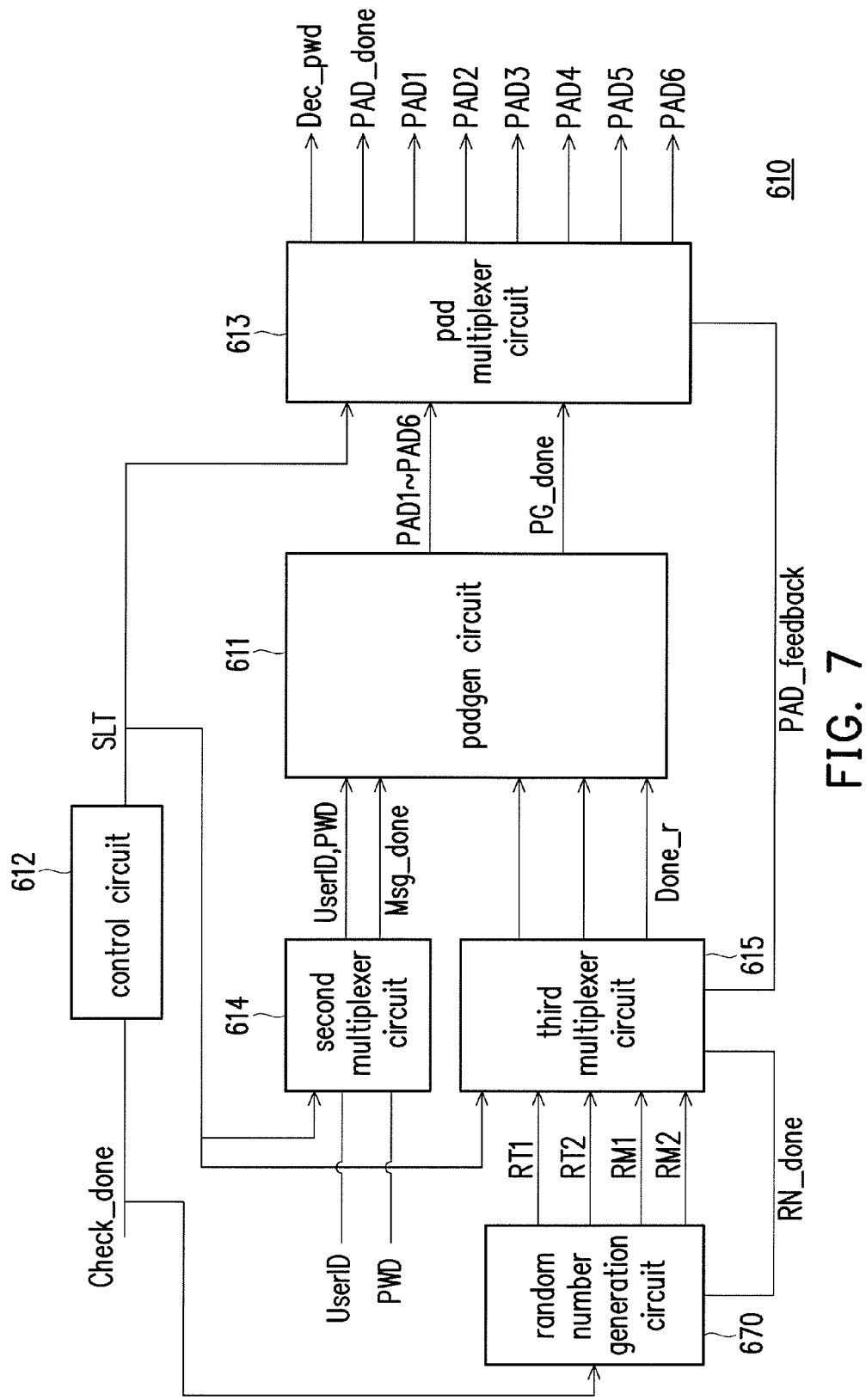
FIG. 7 illustrates a schematic diagram of key generating circuit of the central node device according to an embodiment of the invention.

FIG. 7 illustrates a schematic diagram of key generating circuit of the central node device according to an embodiment of the invention. The key generation circuit 610 comprises a padgen circuit 611, a control circuit 612, a pad multiplexer circuit 613, a second multiplexer circuit 614 and a third multiplexer circuit 615. The padgen circuit 611 may generate the pad keys by using the Padgen function operation based on the password PWD, the user identification UserID, and a first set of random number {RT1, RM1} and a second set of random number {RT2, RM2}. The control circuit 612 may output a control signal SLT to control the pad multiplexer circuit 613, the second multiplexer circuit 614 and the third multiplexer circuit 615. The pad multiplexer circuit 613 may receives the pad keys from the padgen circuit 611 and output part of the pad keys to the XOR operation circuit 630.

The second multiplexer circuit 614 is utilized to select the password PWD or the user identification UserID to transmit to the padgen circuit 611. The third multiplexer circuit 615 is utilized to select the first set of random number {RT1, RM1} or the second set of random number {RT2, RM2} to transmit to the padgen circuit 611. Further, a random number generation circuit 670 may generate the first set of random number {RT1, RM1} or the second set of random number {RT2, RM2}. After the initial generation of random numbers RT1, RM1, RT2 and RM2, simultaneously given the user identification UserID and the password PWD, the second multiplexer circuit 614 and the third multiplexer circuit 615 are utilized to allow the selection of the user identification UserID or the password PWD with a particular pair of random numbers for computing the XOR-Padgen operation. Moreover, the XOR-Padgen function is enabled after receiving an enabling signal, which is the signal Check_done. Once the above condition is established, the pad keys PAD1, PAD2, PAD3, PAD4, PAD5 and PAD6 are then generated by the padgen circuit 611 after another required for calculating cover-coded message in mutual authentication. Also two signals, Dec_pwd and PAD_done are outputted respectively on state {000} and state {101}. The detail functions performed in FIG. 7 are described as follows:

State 1, when the control output signal Slect is {000}:

$$UserID-Padgen(RT1 \oplus RM1, RT2 \oplus RM2) = PAD1 \quad (4.6)$$

Two pair of random numbers {RT1, RM1}, {RT2, RM2} are chosen for XOR operation RT1⊕RM1, RT2⊕RM2, and the resultant two pair of random numbers and UserID are used as inputs for Padgen function, the calculation result PAD1 of Padgen function are outputted and stored the values in register and Dec_pwd signal is outputted for the password decoder circuit 620 in Medication Safety System scheme.

State 2, when the control output signal Slect is {001}:

$$UserID-Padgen(RT1 \oplus RM2, RM1 \oplus RT2) = PAD2 \quad (4.7)$$

Similar method has been conducted with different two pair of random numbers {RT1, RM2}, {RM1, RT2} are chosen for XOR operation, the resultant random numbers and the user identification UserID are used as inputs for Padgen function calculation. The calculation result PAD2 is stored in register for further computation.

State 3, when the control output signal Slect is {010}:

$$UserID-Padgen(RT1, RM1) = PAD3 \quad (4.8)$$

Two random numbers {RT1, RM1} and the user identification UserID are selected as the input of the padgen circuit 611, the pad key PAD3 can then be obtained from the output of Padgen function.

State 4, when the control output signal Slect is {011}:

$$PWD-Padgen(PAD3, RT1) = PAD4 \quad (4.9)$$

Similarly, inputs of the pad key PAD3, random number RT1 and password PWD are selected for Padgen function. Pad key PAD4 then can be obtained from the output of Padgen function.

State 5, when the control output signal Slect is {100}:

$$UserID-Padgen(RT2, RM2) = PAD5 \quad (13)$$

Two random numbers {RT2, RM2} and the user identification UserID are selected as Padgen function input, the pad key PAD5 can then be obtained from the output of Padgen function.

State 6, when the control output signal Sleet is {101}:

$$PWD-\text{Padgen}(PAD5, RT2)=PAD6 \tag{4.10}$$

Similarly, inputs of pad key PAD5, random number RT2 and password PWD are selected for Padgen function. The last pad key, which is the pad key PAD6, then can be obtained from the output of Padgen function and signal PAD_done is also outputted.

In summary, the distributed WSN system implemented in a hospital can provide safe medication administration because of the merits given by electronic devices that secure information on the inpatients, drugs and transmitting data's. This will not only reduce human resource cost, but also drastically decrease prescription errors or mistakes. In this invention, a medication safety mutual authentication protocol with Padgen algorithm is proposed to improve the drawbacks of the authentication scheme in WSN. Through the Padgen algorithm the message can be cover-coded and enhances the security during wireless data transmission.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A central node device that encodes and decodes data in a wireless sensor network system, the central node device comprising:
    a key generation circuit receiving a first cover-coded message, a password and a user identification, producing a plurality of pad keys by using a Padgen function operation, and outputting the pad keys, wherein the first cover-coded message is comprising a first least-bit cover-coded message and a first most-bit cover-coded message;
    a cyclic redundancy check (CRC) code checking circuit receiving the first most-bit cover-coded message and the first least-bit cover-coded message, wherein the first most-bit cover-coded message and the first least-bit cover-coded message are concatenated with cyclic redundancy check codes respectively, verifying if the first most-bit cover-coded message and first least-bit cover-coded message are correct by using corresponding CRC code, and outputting an enable signal to the key generation circuit;
    a password decoder circuit decoding a cover-coded password to generate the password by using part of the pad keys; and
    a XOR operation circuit performing a XOR operation for decoding the first most-bit cover-coded message and the first least-bit cover-coded message to obtain a first most-bit message and a first least-bit message, encoding the first most-bit message and the first least-bit message, and outputting a second most-bit cover-coded message and a second least-bit cover-coded message.

2. The device as claimed in claim 1, further comprising: a first multiplexer circuit collecting the second most-bit cover-coded message and the second least-bit cover-coded message and outputting the second most-bit cover-coded message and the second least-bit cover-coded message; and a cyclic redundancy check (CRC) code generating circuit receiving the second most-bit cover-coded message and the second least-bit cover-coded message from the first multiplexer circuit, the cyclic redundancy check (CRC) code generating circuit processing cyclic redundancy check code encoding for the second most-bit cover-coded message and the second least-bit cover-coded message, and outputting the second most-bit cover-coded message and the second least-bit cover-coded message with cyclic redundancy check codes respectively.

3. The device as claimed in claim 1, wherein the key generation circuit comprising:
    a padgen circuit generating the pad keys by using the Padgen function operation based on the password, the user identification, and a first set of random number and a second set of random number.

4. The device as claimed in claim 3, wherein the key generation circuit comprising:
    a control circuit outputting a control signal; and
    a pad multiplexer circuit receiving the pad keys from the padgen circuit and outputting part of the pad keys to the XOR operation circuit.

5. The device as claimed in claim 3, wherein the key generation circuit comprising:
    a second multiplexer circuit utilized to select the password or the user identification to transmit to the padgen circuit.

6. The device as claimed in claim 3, wherein the key generation circuit comprising:
    a third multiplexer circuit utilized to select the first set of random number or the second set of random number to transmit to the padgen circuit.

7. The device as claimed in claim 1, further comprising:
    a random number generation circuit generating the first set of random number or the second set of random number.

* * * * *